(12) United States Patent
Stone

(10) Patent No.: US 6,584,933 B1
(45) Date of Patent: Jul. 1, 2003

(54) SQUIRREL-PROOF BIRD FEEDER

(76) Inventor: Martin M. Stone, 477 Gallardia Way, Acworth, GA (US) 30102

(*) Notice: Subject to any disclaimer, the term of this patent is extended or adjusted under 35 U.S.C. 154(b) by 0 days.

(21) Appl. No.: 09/997,456

(22) Filed: Nov. 29, 2001

Related U.S. Application Data

(60) Provisional application No. 60/322,584, filed on Sep. 17, 2001.

(51) Int. Cl.[7] .................................................. A01K 61/02
(52) U.S. Cl. ...................................... 119/57.9; 119/57.8
(58) Field of Search ........................ 119/57.9, 52.3, 119/57.8, 52.2

(56) References Cited

U.S. PATENT DOCUMENTS

| | | | | |
|---|---|---|---|---|
| 5,285,747 A | * | 2/1994 | Caldine ..................... | 119/57.9 |
| 5,392,732 A | * | 2/1995 | Fry ............................ | 119/57.9 |
| 5,471,951 A | * | 12/1995 | Collins ....................... | 119/57.9 |
| 5,808,294 A | * | 9/1998 | Neumann ................. | 250/214 AL |
| 5,864,292 A | * | 1/1999 | Roestenberg et al. ...... | 119/57.9 |
| 5,937,788 A | * | 8/1999 | Boyd ......................... | 119/57.9 |
| 6,065,427 A | * | 5/2000 | Peinetti .................... | 119/57.9 |
| 6,276,298 B1 | * | 8/2001 | Welsh ....................... | 119/57.9 |

FOREIGN PATENT DOCUMENTS

FR 2676618 A1 * 11/1992 .......... A01M/29/02

* cited by examiner

Primary Examiner—Peter M. Poon
Assistant Examiner—Joan M. Olszewski
(74) Attorney, Agent, or Firm—Rodgers & Rodgers

(57) ABSTRACT

A squirrel-proof attachment comprises detachable spaced collars that are mounted on a tubular bird feeder. An electrical source, attached to the base of the bird feeder, is powered by solar cells and battery backup and provides voltage that is fed into copper wire loops that are built into the collars.

7 Claims, 6 Drawing Sheets

SQUIRREL-PROOF BIRD FEEDER

The benefits under 35 U.S.C. 119 are claimed based on provisional application 60/322,584 filed Sep. 17, 2001.

FIELD OF THE INVENTION

This invention relates to bird feeders and more particularly pertains to a squirrel-proof bird feeder, which prevents a small animal such as a squirrel from gaining access to the seed in a bird feeder.

BACKGROUND OF THE INVENTION

The use of squirrel-proof bird feeders is known in the prior art, and many implementations have sought to prevent squirrels and other such animals from raiding bird feeder stations. In addition to preventing bird enthusiasts from enjoying their hobby, these unwanted intrusions also cause significant monetary loss in terms of money spent on frequently replenishing bird feed.

Earlier inventions included mechanical as well as electrical devices that depend on specific features such as weight-sensitive mechanisms and trip switches. These inventions have suffered from several limitations. For example, some require special mounting structures as well as customized bird-feeder stations. Such specialized structures are cumbersome to implement and can be expensive thereby making them commercially unattractive. Other inventions while discouraging feeding, remain ineffective in dislodging the animal, thereby resulting in damages caused by the frustrated animal attacking the mechanism. Problems encountered by inventions utilizing weight sensing mechanisms include denial of feed to larger birds or when several birds alight on the feeder simultaneously. Jamming of moving parts is another issue that also renders certain mechanisms ineffective. Inventions which require electrical connections have tended to either require regular battery replacement, or cabling connections to a suitable 120V AC source that can prove cumbersome and potentially hazardous. Normal squirrel raiding behavior on a bird feeder consists of climbing up the mounting pole, hanging upside down from a suitable anchor and scooping out bird feed with its front paws. When the bird feeder is located close to taller structures such as trees, buildings or railings, the squirrel leaps on to the top of the feeder thereby bypassing certain preventive devices which may be attached at a lower level on the mount.

The present invention provides a solution that can be used on commercially available bird feeders using an effective process that resists as well as discourages squirrel raids without causing harm to the animal.

OBJECTS OF THE INVENTION

An object of the invention is to provide a cheap, effective and self-contained mechanism that can be used on most commercially available tubular bird feeders to withstand squirrel raids. This allows birds to be fed satisfactorily and consequently attracts more birds thereby leading to an enhanced bird-watching experience. Squirrels are discouraged from raiding bird feeders and revert to foraging in other places.

A further object of the invention is to provide a system that does not physically harm squirrels while in operation, and also has a lengthy product life with little or no human intervention for maintenance or servicing.

A further object of this invention is to provide a product that pays for itself quickly by reducing bird feed costs and can be manufactured easily at low cost, thereby making it attractive to the general public.

SUMMARY OF THE INVENTION

The general purpose of the present invention, which will be described subsequently in greater detail, is to provide a new squirrel-proof bird feeder apparatus and method which has many of the advantages of existing devices and incorporates many novel features that result in a new squirrel-proof bird feeder which is not anticipated, rendered obvious, suggested, or even implied by the prior art bird feeders, either alone or in any combination thereof.

To attain this, the present invention generally comprised of attachable collars that are mounted, suitably spaced, around commercially available tubular bird feeders. An electrical source, attached to the base of the bird feeder, is powered by solar cells and battery backup, and provides high voltage that is fed into copper wire loops that are built into the attachable collars. The copper wire loops also incorporate projecting barbs along the circumference of the loops. When a squirrel climbs on to the bird feeder tube and straddles two such collars, thereby bridging two copper wire connections, an electrical path is created, applying voltage to the squirrel and causing it to be dislodged from the bird feeder. The anatomy as well as behavior of birds using the feeder perches precludes similar electrical contact, as they will not be bridging two collars in the manner that a squirrel will while it travels along the length of the bird feeder tube would.

The apparatus consists of two main components: an electrical system consisting of solar panels, battery backup and electronic circuitry to generate high voltage; and a mechanical system consisting of squirrel-proofing collars, high-voltage power conduit and a housing for the electrical components.

While several types of solar panel fixtures can be utilized, one particularly convenient type consists of flexible silicon solar panels that can be wrapped around the mechanical housing for the electronics, also referred to as the Control Module. This enables the solar panels to gather sunlight and generate electricity all day long.

The batteries used are rechargeable types, which generally utilize nickel metal hydride or nickel cadmium technology. With improvements in battery technology several other options can be utilized. For example, Lithium-ion types, though handicapped by environmental heat constraints, could provide improved efficiency in energy generation. The rechargeable batteries are charged by the solar panels, and provide a source of electrical power to the electronic circuitry when the solar panels are unable to do so at night or during unfavorable solar conditions.

The electronic circuit accepts DC voltage from either the solar panels or the batteries and generates a pulsing high voltage signal with a limited current output. This kind of voltage proves sufficient to dislodge small animals from the bird feeder without causing them permanent harm. The electronic circuit incorporates low voltage to high voltage conversion, energy storage and pulse generation.

The squirrel-proofing collars encircle the tubular bird feeder and are placed in between the feeding perches as well as between the top of the feeder and the first feeding perch located below the top end of the bird feeder. The ring itself is made of non-conductive plastic, preferably re-cycled, and has a hinge 180 degrees from the ends that attach to the Main Power conduit. The hinge enables the rings to be opened, much like a solid bracelet, and placed around the circular body of the bird feeder. Bare copper wire has been wrapped around these collars in such a manner that it provides the unsuspecting squirrel a convenient object to hold on to. This mechanism is further enhanced by the provision of several protruding barbs along the periphery of the collar. These barbs have been created by suitably twisting the bare copper wire. Furthermore, the topmost collar is equipped with an additional connection to the top metal housing or bird feeder hanging wire, thereby adding these elements as part of the circuit.

The main power conduit conveys the high voltage generated in the Control Module to the multiple squirrel-proof collars. It also acts as a mechanical anchor for easy installation of the collars along the length of the bird feeder tube.

The Control Module houses the electronic circuitry and rechargeable batteries inside a waterproof enclosure and has the solar power panels mounted around its external, cylindrical surface. It incorporates several other features such as a photo-detector switch, a LED indicator and an external power coupling mechanism to allow connection to wires from the Main Power conduit.

DETAILED DESCRIPTION OF THE PREFERRED EMBODIMENT

Figure 1:
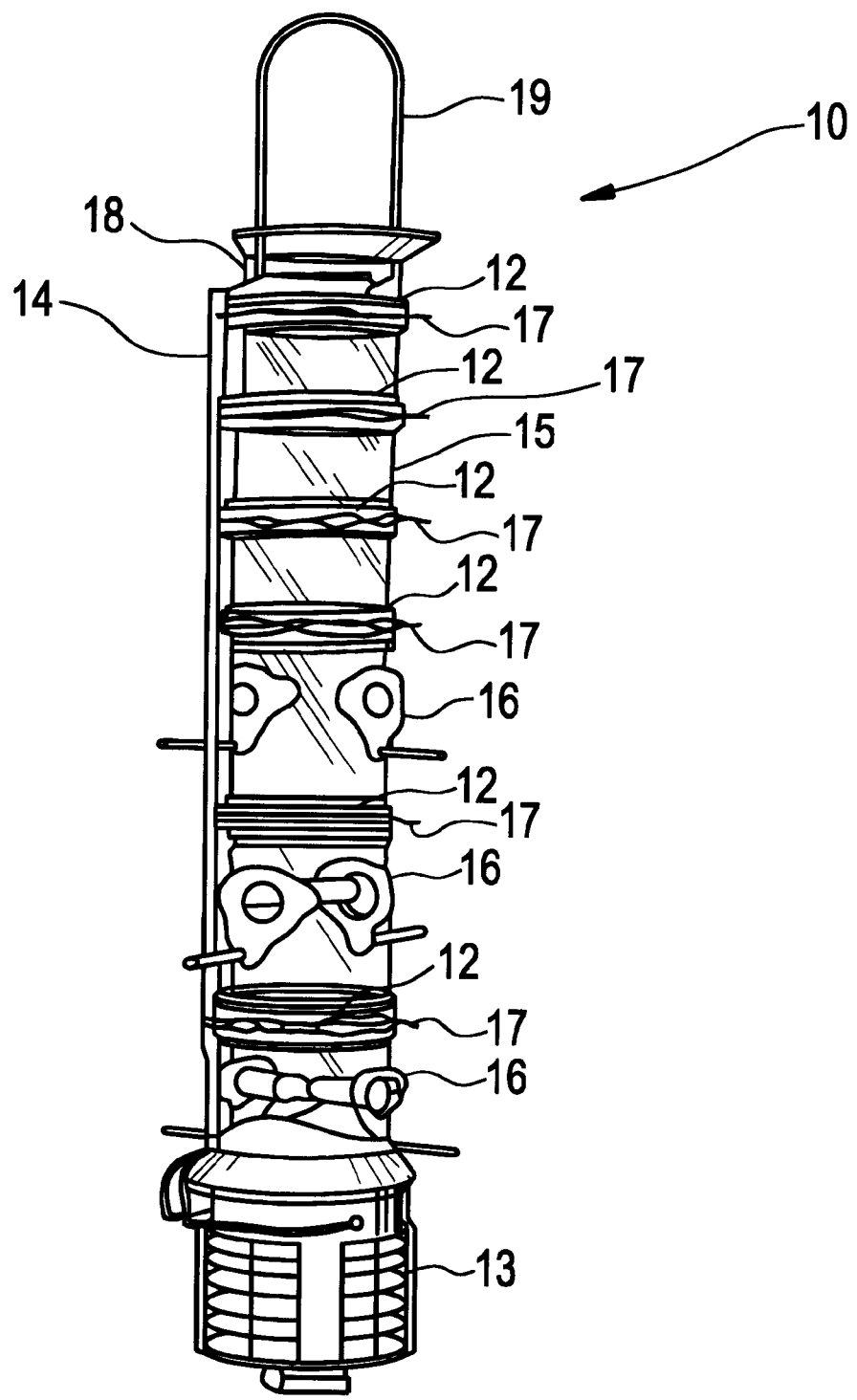
FIG. 1 shows the squirrel-proofing mechanism assembled upon a commercial tubular bird feeder.

FIG. 1 shows the squirrel proofing mechanism assembled upon a commercial tubular bird feeder, embodying the principles and concepts of the present invention and generally designated by the reference numeral 10. It comprises of a set of squirrel-proofing collars 12 that are mounted on the tubular bird feeder unit 15. These collars are spaced at regular intervals as shown, and are located on either side of the bird perches 16. These bird perches 16 are an integral part of the commercial tubular bird feeder and are left undisturbed when creating the squirrel-proof bird feeder assembly 10. The Main Power conduit 14 conveys the high voltage pulses generated by the Control Module 13 to the squirrel proofing collars 12, and is routed to the wire assembly 17 that is a part of the squirrel proofing collars 12.

Figure 2:
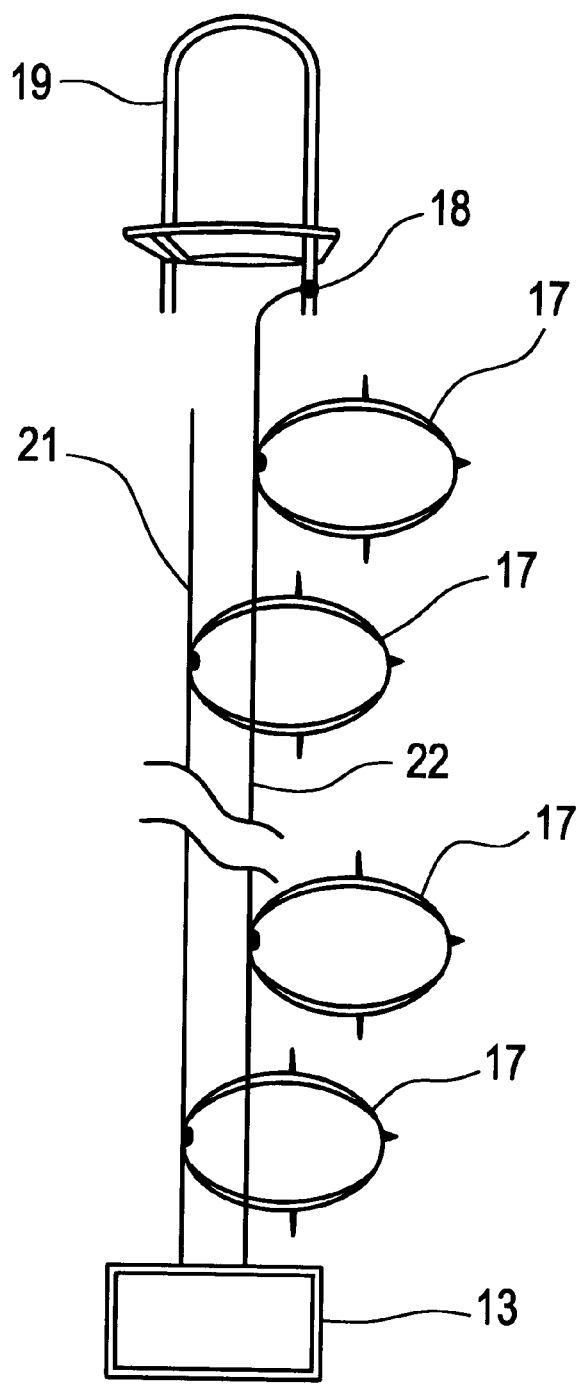
FIG. 2 is a circuit diagram that indicates the electrical connectivity or operation of the mechanism.

FIG. 2 is a circuit diagram that indicates the electrical connectivity for operation of the squirrel-proof bird feeder assembly 10. Control Module 13 contains the voltage generating circuit and the power source consisting of solar panels and rechargeable batteries. High voltage pulses generated by the Control Module 13 are conveyed by the Main Power conduit 14 via two conductors 21 and 22. The first conductor 21 conducts the high voltage pulses while the second conductor 22 is the ground lead for the return path for electrical current. The two conductors, 21 and 22, provide connections to the wire assembly 17 in the squirrel proofing collars 12 as shown in FIG. 2. Every other wire assembly 17 is connected to the first conductor 21, while the remaining wire assemblies 17 are connected to the second conductor 22, thereby forming an alternating pattern of connections as shown in FIG. 2. The topmost wire assembly 17, which is connected to second conductor 22, is also connected to the mounting metal loop 19, via a wire jumper 18, thereby making the mounting metal loop 19 a part of the overall circuit. This additional connection enhances the effectiveness of the mechanism in situations where squirrels tend to get on to the top part of the squirrel-proof bird feeder assembly 10.

In the process of climbing up or down the tubular bird feeder unit 15, a squirrel would bridge the wire assembly 17 contained in one squirrel proofing collar 12 connected to conductor 21, with an adjacent wire assembly 17 contained in a neighboring squirrel proofing collar 12 connected to conductor 22; thereby completing an electrical path for current to flow through the animal's body. This current causes the squirrel to lose its hold on the squirrel-proof bird feeder assembly 10 and is consequently dislodged from it.

Figure 3:
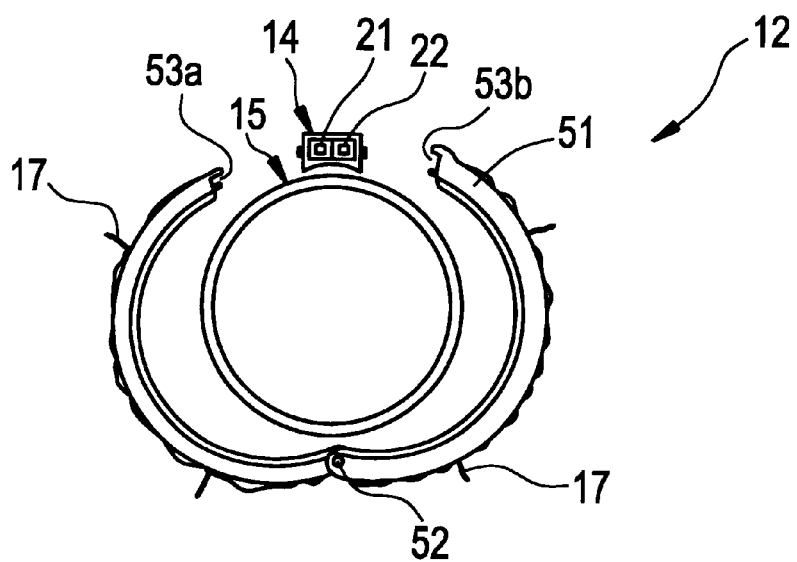
FIG. 3 shows the construction and embodiment of a squirrel-proof collar.

FIG. 3 shows the construction and embodiment of a squirrel proofing collar 12. It consists of a plastic collar 51, which has a hinge 52 at one end and snap-on connector 53a is made from electrically conductive metal, while snap-on connector 53b is made from nonconductive plastic. Bare copper wire is looped around this plastic collar 51, to create the wire assembly 17 which is electrically connected to snap-on connector 53a. This wire assembly 17 also consists of several loops with protruding barbs that extend away from the plastic collar 51. The squirrel proofing collar 12 opens like a bracelet due to the presence of the hinge 52. The collar snap-on connector 53 permits connection between the wire assembly 17 and the conductors 21 and 22 inside the Main Power conduit 14.

Figure 4:
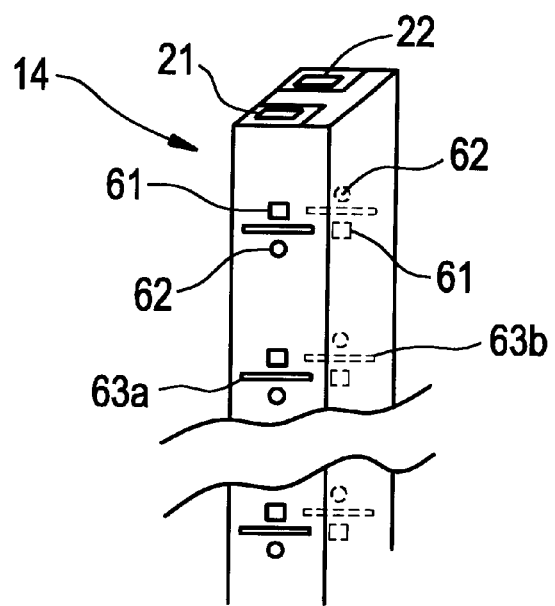
FIG. 4 shows the construction and embodiment of the Main Power conduit.

FIG. 4 shows the construction and embodiment of the Main Power conduit 14. The two conductors 21 and 22 are located inside the assembly. The squirrel proofing collar 12 is mechanically attached to the Main Power conduit 14 through two snap-on connector clips 61 and 62 which mate with the collar snap-on connectors 53a and 53b. Electrical connectivity between squirrel proofing collar 12 and conductors 21 and 22 inside the Main Power conduit 14 is provided through terminals 63a and 63b which are located on the two edges of the Main Power conduit 14 as shown. Terminal 63a provides pulsed high voltage from conductor 21, while terminal 63b provides the ground connection from conductor 22.

Figure 5:
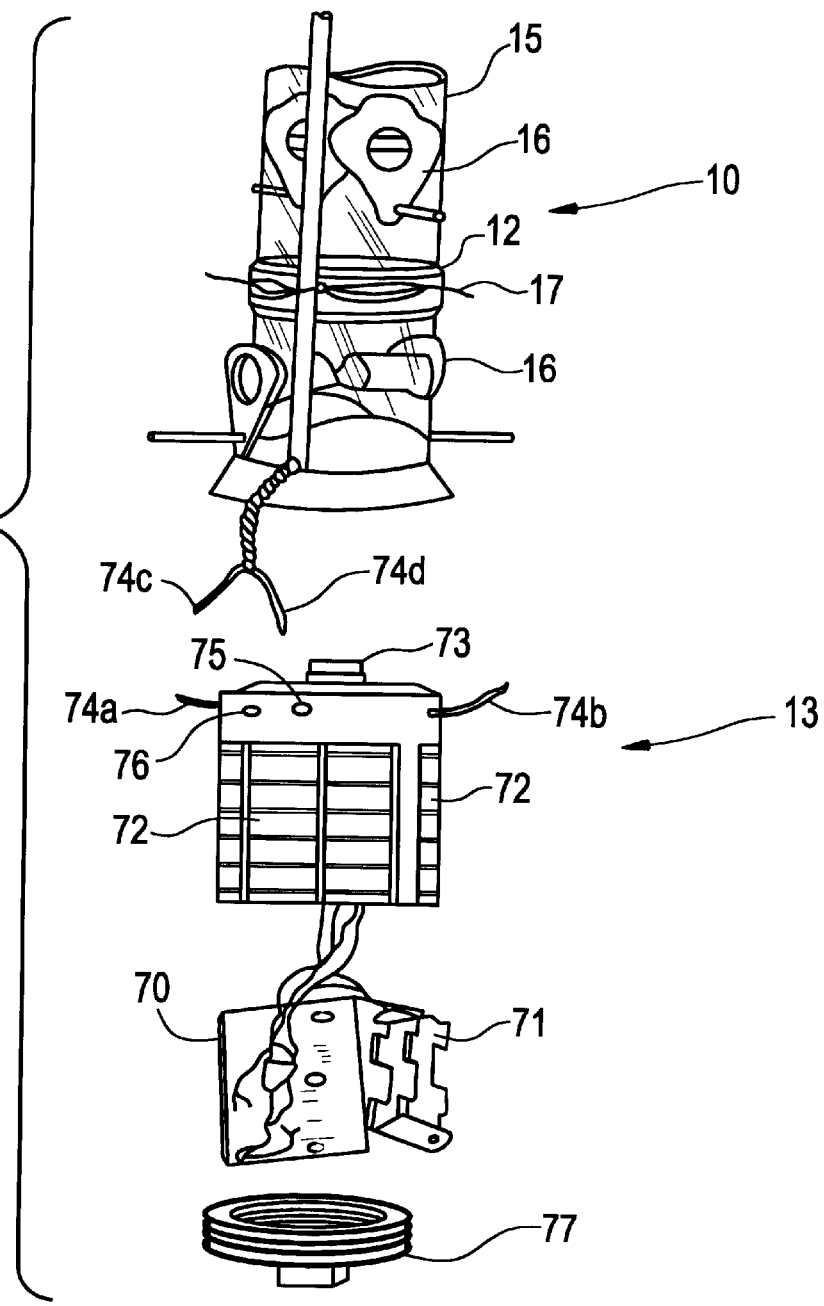
FIG. 5 shows an external view of the Control Module and the elements that are incorporated inside and outside the housing.

FIG. 5 shows an external view of the Control Module 13 and the elements that are incorporated inside and outside the housing. The Control Module 13 is a cylindrical shaped assembly that is attached to the commercial tubular feeder 15 via the threaded fitting 73. The bottom part 77 contains vent holes to allow air cooling of the electronic circuitry which is assembled on a Printed Circuit board assembly 70. This Printed Circuit board assembly 70 is connected to a battery holder 71, and is placed inside the housing. Four or more flexible solar panels 72 are mounted to the outside surface as shown. LED indicator 76 indicates presence of high voltage, while photo detector 75 is connected to the Printed Circuit board assembly 70. The output of the Printed Circuit board assembly 70 is brought out of the housing by the two wires 74a and 74b as shown. These two wires 74a and 74b connect into the two conductors 21 and 22 of the Main Power conduit 14 via the two power coupling wires 74c and 74d of FIG. 5. The two wires 74a and 74b are color-coded and should be connected to the identically color-coded power coupling wires 74c and 74d in correct correspondence. This ensures that the mounting metal loop 19 on top of the squirrel-proof bird feeder assembly 10 is connected to ground and not high voltage.

Figure 6:
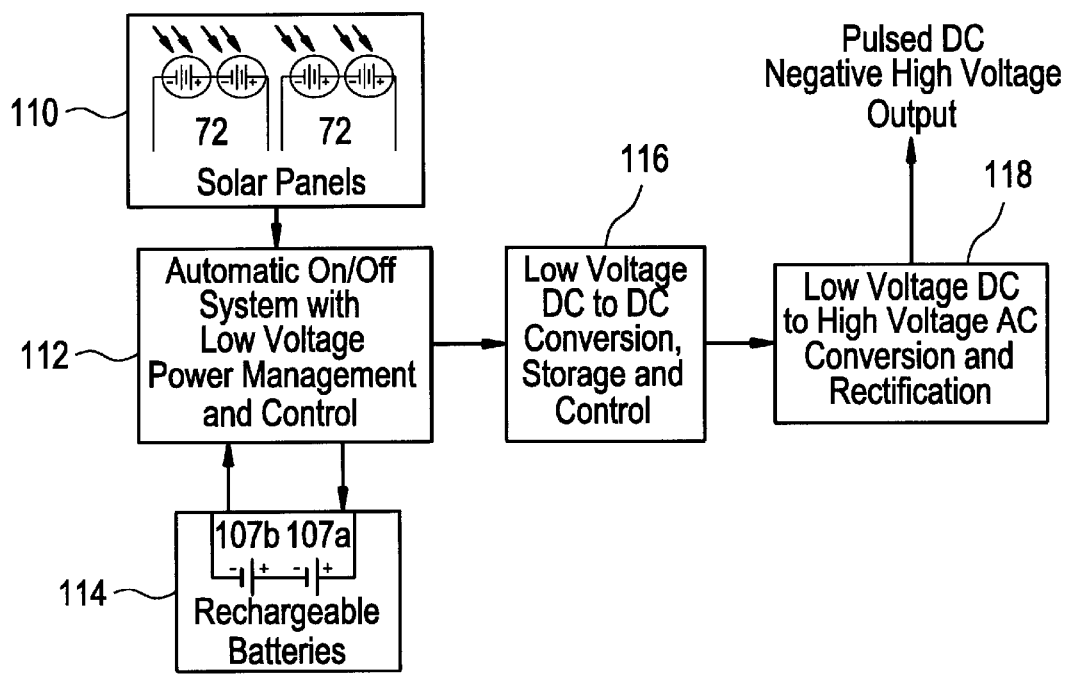
FIG. 6 is a block diagram that provides a functional breakdown of the electronic circuitry housed in the Control Module.

FIG. 6 is a block diagram that provides a functional breakdown of the electronic circuitry housed in the Control Module 13. It shows a power block 110 containing the solar panels. These solar panels generate a low voltage output that is fed into a control unit block 112 that carries out switching and power management functions. The two rechargeable batteries 107a and 107b shown in the battery block 114, also connect into the control unit block 112. The output of the control unit block 112 is fed into a storage system block 116 which stores the voltage and then routes it to a Low voltage DC to High voltage pulsed output generation circuit block 118 which generates the high voltage pulse output which is routed to the Main Power conduit 14. The high voltage output is of negative polarity which provides certain physical advantages over using a positive voltage.

Figure 7:
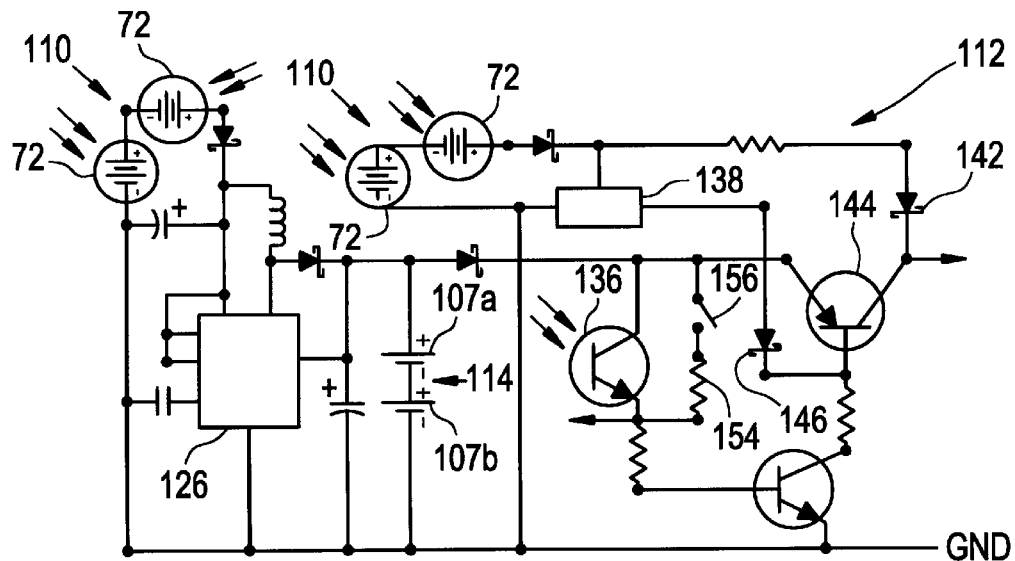
FIG. 7 is the circuit diagram of the control unit which carries out automatic on/off and low voltage power management and control functions.

FIG. 7 is the circuit diagram of three functional blocks, namely solar power 110, control unit 112 and rechargeable batteries 114. Control unit block 112 carries out automatic on/off and low voltage power management and control. The purpose of this unit is to provide intelligent control over the solar power 110, battery backup 114 and recharging functions. The phototransistor 136 acts as a sensor switch which shuts down the Printed Circuit board assembly 70 at night and switches it back on at daylight. The addition of switch 156 in series with resistor 154 provides full-time 24 hour operation if the switch 156 is in the closed position, thereby bypassing phototransistor 136. Once activated by phototransistor 136 or switch 156, the Printed Circuit board assembly 70 will automatically switch from battery power to solar power when the solar panels 72 begin to produce a minimum of 2.4 volts. Voltage detector 138 injects a positive voltage into the base of transistor 144 through diode 146, which causes transistor 144 to turn of thereby cutting off the voltage from batteries 107a and 107b from being passed through it. The voltage generated by solar panels 72 are routed out through diode 142 to the storage system block 116. Conversely, when the solar panels 72 produce less than 2.4 volts, transistor 144 is turned on and routes the voltage generated by the batteries 107a and 107b to the storage system block 116. The integrated circuit 126 is used to charge the rechargeable batteries 107a and 107b with the voltage generated by the solar panels 72 whenever the battery voltage is not required to be routed to the storage system block 116. The Printed Circuit board assembly 70 will revert to the voltage generated by batteries 107a and 107b at dusk or under overcast conditions when the solar panels 72 produce less than 2.4 volts.

Figure 8:
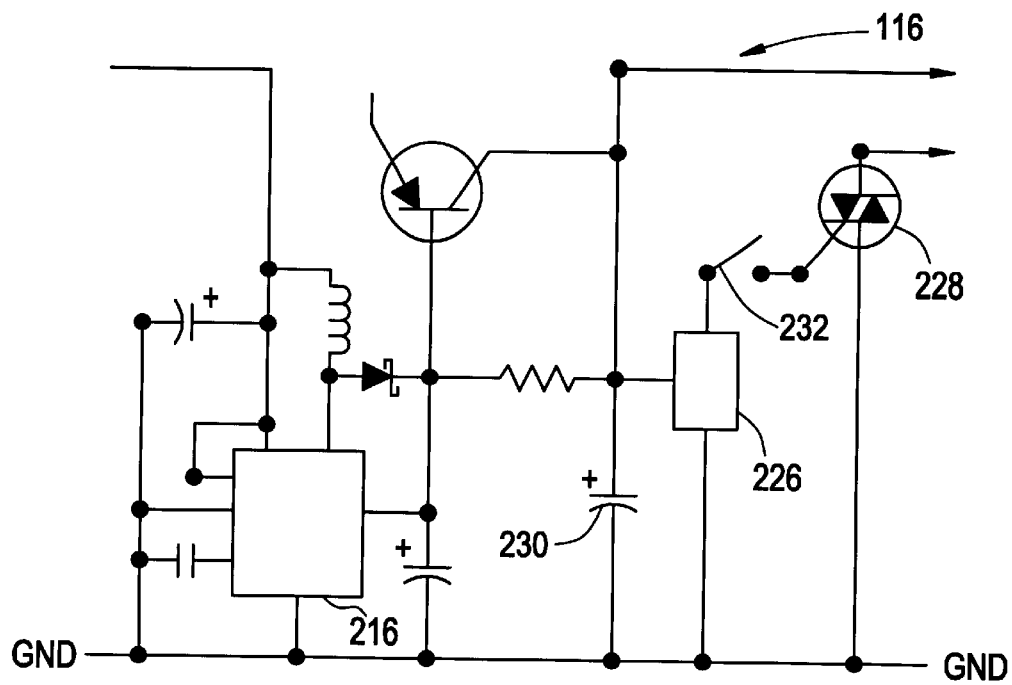
FIG. 8 is the circuit diagram of the storage system for the low voltage power conversion, storage and control function.

FIG. 8 is the circuit diagram of the storage system block 116 for the low voltage power conversion, storage and control.

Storage system block 116 takes the approximately 3V voltage output from control unit block 112 and steps it up via integrated circuit 216 to 5 volts. This voltage is stored in a large electrolytic capacitor 230. When switch 232 is closed, triac 228 switches this voltage, under control from voltage detector 226, to the low voltage DC to high voltage pulsed output generation circuit 118 of FIG. 9.

Figure 9:
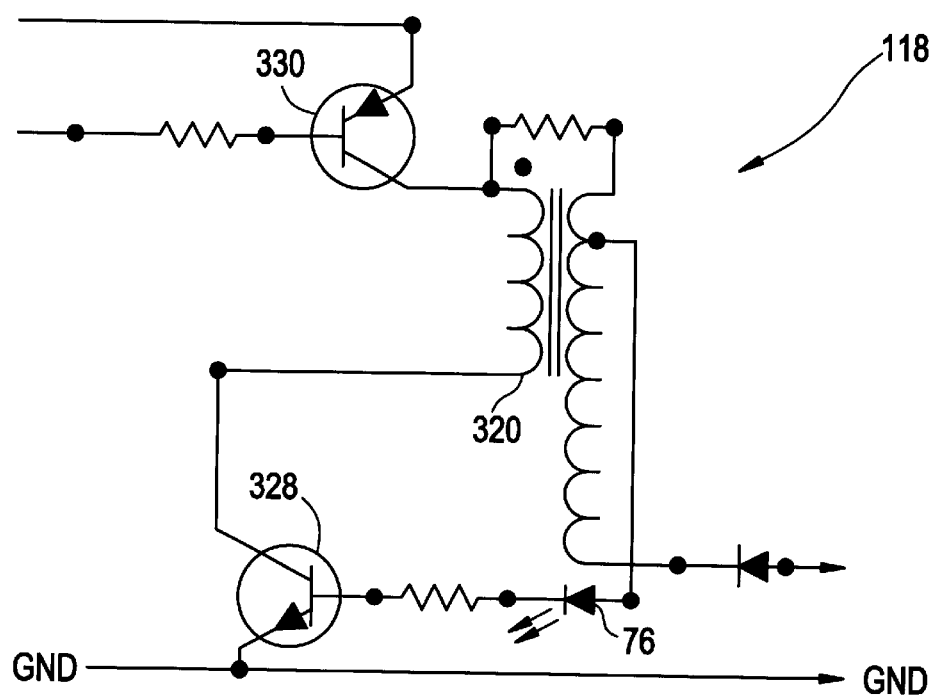
FIG. 9 is the circuit diagram for the low voltage DC to high voltage pulsed output generation function.

FIG. 9 is the circuit diagram of the low voltage DC to high voltage pulsed output generation circuit 118. This circuit steps up the stored 5 volts to over—1000 volts at 4.5 mA. This process is carried out by the step-up transformer 320 connected as shown to transistors 330 and 328. This circuit combination produces oscillations via the feedback mechanism of a side-tap from step-up transformer 320 through indicator LED 76. LED indicator 76 displays presence of high voltage discharge. The output of the low voltage DC to high voltage pulsed output generation circuit 118 is fed into the Main Power conduit 14.

As to the manner of usage and operation of the present invention, the same should be apparent from the above description. While the operation of the squirrel-proof bird feeder assembly 10 has been outlined with reference to one particular construction method in this preferred embodiment, it is to be realized that variations in size, material, shape, form and function are deemed readily apparent and obvious to one skilled in the art. Therefore, the description is considered as illustrative only of the principles of the invention, and it is not desired to limit the invention to the exact construction and operation described. Accordingly, all suitable modifications and equivalents will fall within the scope of this invention.

What is claimed is:

1. A bird feeder attachment for deterring squirrels, said feeder comprising an elongated generally tubular seed container having at least one opening for dispensing seed therethrough, said attachment comprising a pair of spaced detachable collars extending around the periphery of said container, said collars being spaced a sufficient distance so as to be bridged only by a substantial portion of said squirrel's body, a control module detachably secured to said container at one end thereof, a power conduit interconnecting said collars and said control module, means for generating high voltage pulses from said control module to said collars, said collars comprising a pair of wire assemblies extending around the outer surface of said collars respectively and connected to said power conduit, and multiple protruding bars extending outwardly from said wire assemblies.

2. A bird feeder attachment according to claim 1 wherein said power conduit comprises a pair of conductors and wherein electrical pulses are generated by said control module to said conductors.

3. A bird feeder attachment according to claim 2 wherein one of said conductors conveys electrical pulses and wherein said second conductor is the ground.

4. A bird feeder attachment according to claim 1 wherein at least one solar panel is secured to said control module and is electrically interconnected to said control module.

5. A bird feeder attachment according to claim 4 wherein a pair of rechargeable batteries are disposed in said control module and are Electrically interconnected to said control module.

6. A bird feeder attachment according to claim 5 wherein a phototransistor is disposed within said control module and is electrically interconnected to said control module and which reacts to the presence of daylight to cause activation of the electrical system.

7. A bird feeder attachment according to claim 4 wherein a voltage detector is disposed within said control module and is electrically interconnected to said solar panel to determine when to switch from battery power to solar power and from solar power to battery power.

* * * * *